US012734441B2

(12) United States Patent
Okamura et al.

(10) Patent No.: US 12,734,441 B2
(45) Date of Patent: Sep. 15, 2026

(54) GAME DEVELOPMENT SUPPORT SYSTEM, GAME DEVELOPMENT SUPPORT METHOD, AND COMPUTER-READABLE NON-TRANSITORY STORAGE MEDIUM HAVING STORED THEREIN GAME DEVELOPMENT SUPPORT PROGRAM

(71) Applicant: Nintendo Co., Ltd., Kyoto (JP)

(72) Inventors: Yuichiro Okamura, Kyoto (JP); Masaki Muto, Kyoto (JP); Wataru Mori, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 367 days.

(21) Appl. No.: 18/399,281

(22) Filed: Dec. 28, 2023

(65) Prior Publication Data

US 2025/0050209 A1 Feb. 13, 2025

(30) Foreign Application Priority Data

Aug. 7, 2023 (JP) ................................. 2023-128254

(51) Int. Cl.
*A63F 13/52* (2014.01)
*G06T 3/40* (2024.01)

(52) U.S. Cl.
CPC ................ *A63F 13/52* (2014.09); *G06T 3/40* (2013.01)

(58) Field of Classification Search
CPC ........ A63F 13/52; A63F 13/497; A63F 13/60; A63F 13/67; G06T 3/40
USPC ............................................................ 463/31
See application file for complete search history.

(56) References Cited

U.S. PATENT DOCUMENTS

| | | | | |
|---|---|---|---|---|
| 9,104,962 B2 * | 8/2015 | Lee | ......................... | A63F 13/12 |
| 9,122,984 B2 * | 9/2015 | Lee | ....................... | A63F 13/352 |
| 9,384,442 B2 * | 7/2016 | Lee | ......................... | A63F 13/60 |
| 2007/0185909 A1 * | 8/2007 | Klein | ........................ | G06F 8/20 |
| 2008/0220873 A1 * | 9/2008 | Lee | ....................... | A63F 13/352 463/42 |

(Continued)

FOREIGN PATENT DOCUMENTS

| | | |
|---|---|---|
| JP | 2003-093734 | 4/2003 |
| JP | 2004-041593 | 2/2004 |

(Continued)

OTHER PUBLICATIONS

"Unity—Manual: Dynamic resolution", unity3d, retrieved on Dec. 28, 2023, 6 pages, https://docs.unity3d.com/2018.4/Documentation/Manual/Dyna micResolution.html.

*Primary Examiner* — Pierre E Elisca
(74) *Attorney, Agent, or Firm* — Nixon & Vanderhye PC

(57) ABSTRACT

A game program that includes a program of dynamic rendering setting for changing rendering setting in accordance with a load of a rendering process during a game, is executed. A predetermined cut scene during the game is reproduced with the dynamic rendering setting being invalidated, and the load of the rendering process during reproduction of the cut scene is measured. When the cut scene is reproduced with the dynamic rendering setting being valid, at a timing in the cut scene satisfying a predetermined condition, based on transition of the measured load, a substitute load to be used for the dynamic rendering setting instead of the load of the rendering process being executed at the timing, is set, and data of the substitute load is stored.

27 Claims, 12 Drawing Sheets

(56) References Cited

U.S. PATENT DOCUMENTS

2008/0220973 A1* 9/2008 Fischer ................ C07D 261/04
514/425
2009/0113445 A1* 4/2009 Sakashita ................ A63F 13/54
717/126
2016/0001184 A1* 1/2016 Sepulveda .............. A63F 13/60
463/31
2016/0001187 A1* 1/2016 Sepulveda .............. A63F 13/49
463/31
2021/0235139 A1 7/2021 Aoki et al.
2022/0161139 A1* 5/2022 Inaba .................... A63F 13/211

FOREIGN PATENT DOCUMENTS

JP 2018-061674 4/2018
JP 2020/036213 2/2020
JP 2022-084336 6/2022

* cited by examiner

F I G. 1
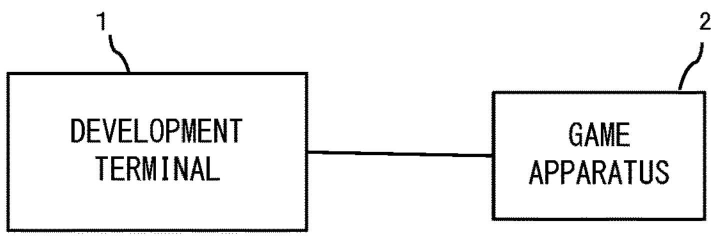
F I G. 2
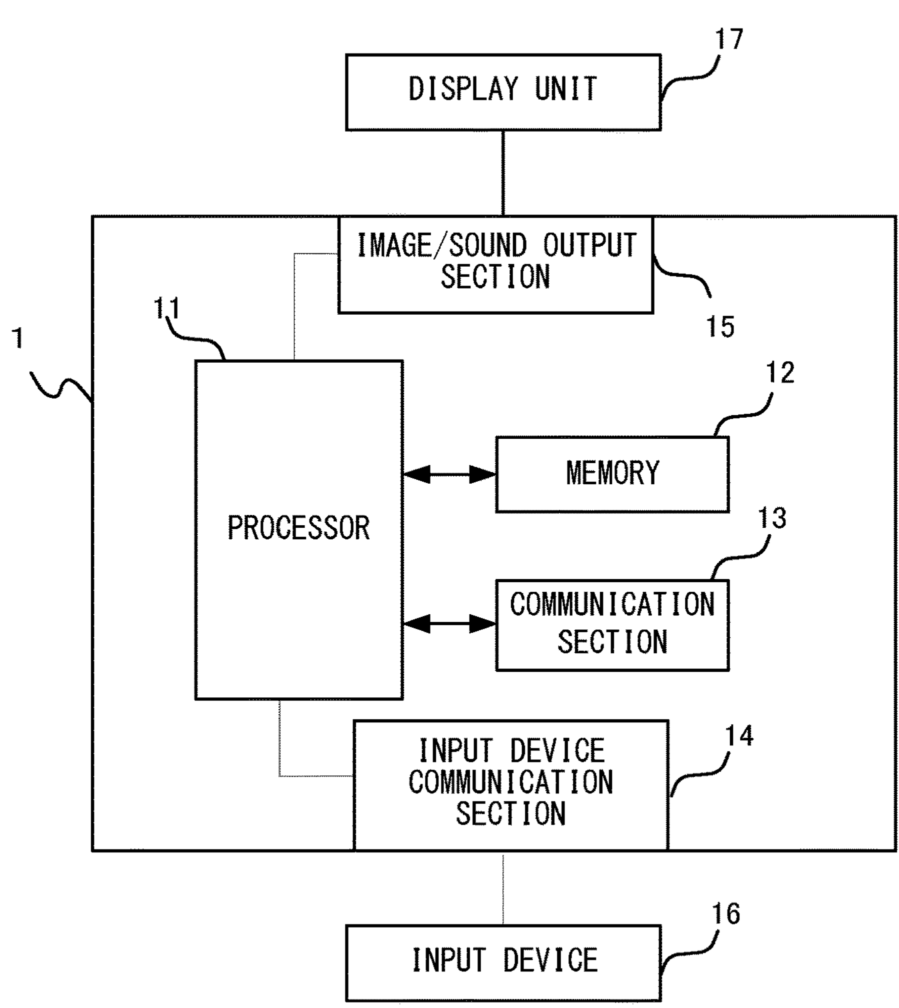

F I G. 3
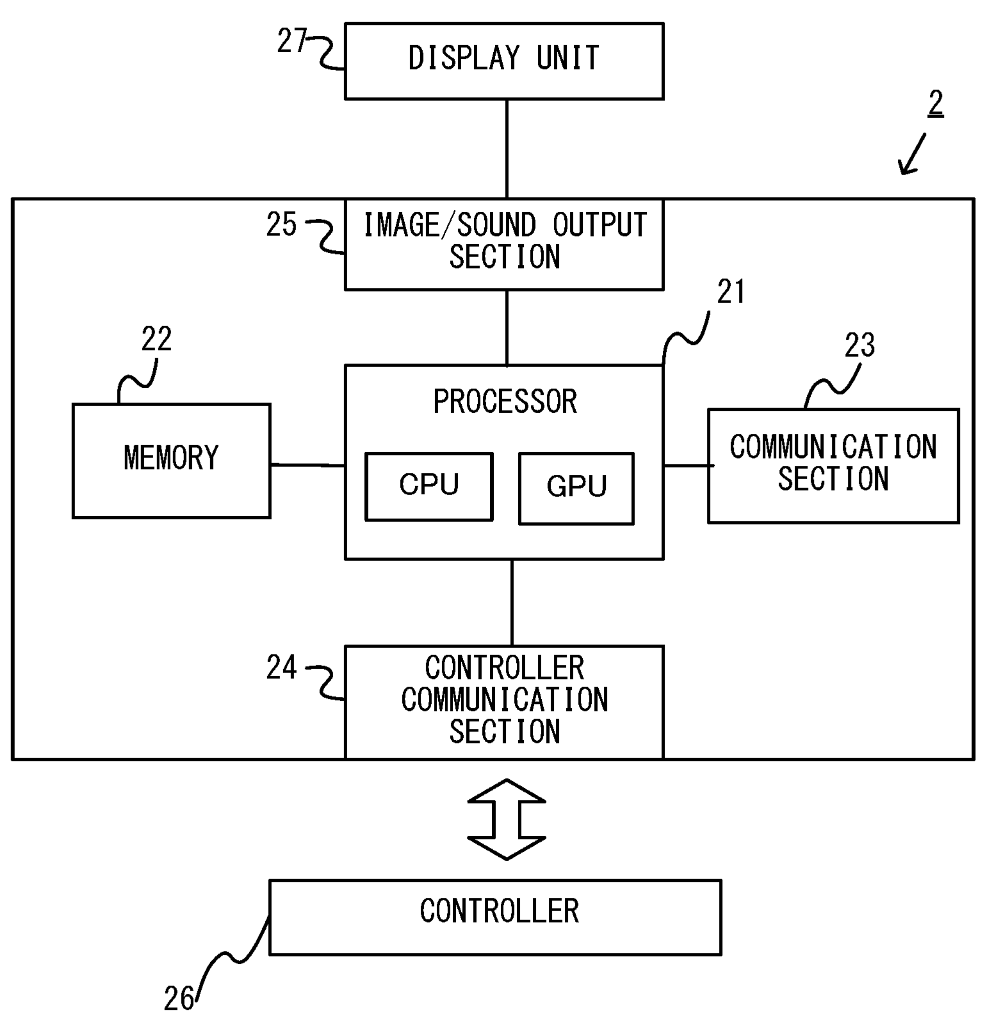

F I G. 4
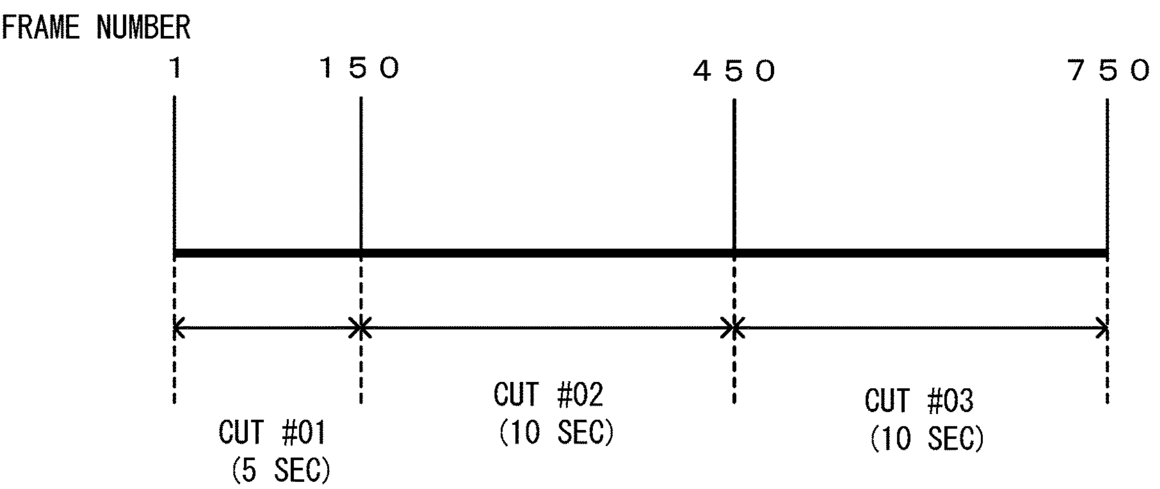
F I G. 5
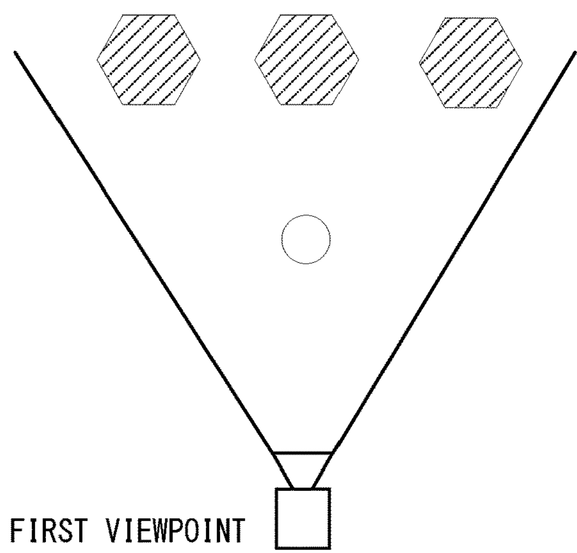
CUT #01
○ ··· PLAYER OBJECT
⬡ ··· COLUMNAR OBJECT

502

511, 512, 513

| FRAME NUMBER | GPU LOAD | CUT CHANGE FLAG |
|---|---|---|
| 0001 | 40% | True |
| 0002 | 35% | false |
| 0003 | 37% | false |
| ⋮ | ⋮ | ⋮ |

503

514, 515

| FORCED SETTING FRAME NUMBER | SUBSTITUTE LOAD VALUE |
|---|---|
| 151 | 90% |
| 451 | 100% |
| 751 | 95% |
| ⋮ | ⋮ |

GAME DEVELOPMENT SUPPORT SYSTEM, GAME DEVELOPMENT SUPPORT METHOD, AND COMPUTER-READABLE NON-TRANSITORY STORAGE MEDIUM HAVING STORED THEREIN GAME DEVELOPMENT SUPPORT PROGRAM

CROSS REFERENCE TO RELATED APPLICATION

This application claims priority to Japanese Patent Application No. 2023-128254 filed on Aug. 7, 2023, the entire contents of which are incorporated herein by reference.

FIELD

The present disclosure relates to image processing in game processing.

BACKGROUND AND SUMMARY

Hitherto, a technique called dynamic resolution or variable resolution that is used for game processing or the like, has been known.

In this technique, resolution is reduced according to the processing load on a graphics processing unit (GPU) to reduce the load on the GPU. In this technique, however, whether or not to reduce the resolution is determined based on the processing load on the GPU in a frame previous (e.g., by one frame) to the current frame. Therefore, when the processing load on the GPU is sharply increased, a reduction in the frame rate may temporarily occur before the resolution is actually reduced. In this regard, there is a room for improvement to inhibit such a reduction in the frame rate.

In view of the above, for example, the following configuration examples are exemplified.

(Configuration 1)

Configuration 1 is a game development support system including at least one processor. The processor is configured to: execute a game program that includes a program of dynamic rendering setting for changing rendering setting in accordance with a load of a rendering process during a game: reproduce a predetermined cut scene during the game with the dynamic rendering setting being invalidated; measure the load of the rendering process during reproduction of the cut scene; and, when the cut scene is reproduced with the dynamic rendering setting being valid, at a timing in the cut scene satisfying a predetermined condition, based on transition of the measured load, set a substitute load to be used for the dynamic rendering setting instead of the load of the rendering process being executed at the timing, and store data of the substitute load.

According to the above configuration, the rendering processing load of the cut scene is measured in advance with the dynamic rendering setting being invalidated. Based on the measurement result, the substitute load to be used for the dynamic rendering setting at a predetermined timing in the cut scene is determined, and stored. Thus, when a cut scene is rendered in product version game processing, the substitute load based on the load measured in advance is used, whereby the rendering setting can be changed before the frame rate is reduced.

(Configuration 2)

According to configuration 2, in the above configuration 1, in a first case in which, at a predetermined timing in the cut scene, a degree of increase of the load in a first period on and after the predetermined timing exceeds a predetermined criterion, the processor may set the substitute load for a first timing, in the cut scene, indicating the predetermined timing.

According to the above configuration, the substitute load can be set in accordance with the timing at which the load of the rendering process is sharply increased in the cut scene. Thus, the rendering setting can be changed at this timing. Therefore, the load of the rendering process can be prevented from being sharply increased.

(Configuration 3)

According to configuration 3, in the above configuration 2, the cut scene may be composed of at least one cut, and the first period may be a period on and after the first timing and having a predetermined length within a range of the cut.

According to the above configuration, since the substitute load is set in cut units, the substitute load can be appropriately set according to each cut.

(Configuration 4)

According to configuration 4, in the above configuration 3, in a second case in which a cut change has occurred, the processor may store a maximum load within a second period that starts when a predetermined period has elapsed after the cut change, as the substitute load at a second timing at the cut change. The processor may not necessarily store the substitute load based on the first case, during a third period from the second timing.

According to the above configuration, the rendering setting can be prevented from being excessively reduced in a cut. In a frame in which a cut change has occurred, the load tends to be increased due to a process for the change, as compared to the load in the cut. On the other hand, since the content (picture) of the cut is significantly changed, it is difficult to visually recognize slowdown in this frame. Therefore, by using the maximum load in the second period that starts a short while after the cut change, the rendering setting can be prevented from being excessively reduced. In addition, setting of the substitute load in the first case may be dispensed with during the third period from the second timing.

(Configuration 5)

According to configuration 5, in the above configuration 1, the cut scene may be composed of at least one cut. In a second case in which a cut change has occurred, the processor may store a maximum load within a second period that starts when a predetermined period has elapsed after the cut change, as the substitute load at a second timing at the cut change.

According to the above configuration, since it is difficult to visually recognize slowdown at the cut change, the maximum load in the second period that starts when a predetermined period has elapsed after the cut change is used as the substitute load, whereby the rendering setting is prevented from being excessively reduced in the cut.

(Configuration 6)

According to configuration 6, in any of the above configurations 2 to 4, in the first case, the processor may set a load, within the first period, which has increased and exceeded the predetermined criterion, as the substitute load at the first timing.

According to the above configuration, if the increased load is high, the rendering setting can be changed at a timing before the increase of the load.

(Configuration 7)

According to configuration 7, in any of the above configurations 1 to 5, the dynamic rendering setting may include at least dynamic resolution setting for reducing rendering resolution when the load of the rendering process during the game is high.

According to the above configuration, the load of the rendering process can be reduced by reducing the rendering resolution.

(Configuration 8)

According to configuration 8, in any of the above configurations 1 to 7, the dynamic rendering setting may include at least dynamic resolution setting for reducing rendering resolution when the load of the rendering process during the game is high, and increasing the rendering resolution when the substitute load is low or when the load of the rendering process is low when a predetermined period has elapsed after the rendering resolution was reduced.

According to the above configuration, since the substitute load is used even in a case other than the case in which the load is high at the cut change, if the load has been reduced after the cut change in the setting that inhibits frequent change in resolution, the resolution can be returned to the original resolution.

(Configuration 9)

According to configuration 9, in any of the above configurations 1 to 5, the processor may automatically and periodically execute the game program at a prescribed timing, perform cut scene reproduction and load measurement for each cut scene included in the game, and update and store the data of the substitute load.

According to the above configuration, even if the rendering process and the content of the cut scene are changed during development, appropriate rendering setting for the latest version can be performed without requiring the developer to do the tasks again.

According to the present disclosure, rendering setting that can inhibit the frame rate from being temporarily reduced during reproduction of a cut scene, can be automatically performed in the development stage of a game.

BRIEF DESCRIPTION OF THE DRAWINGS

FIG. 1 is a schematic diagram showing a non-limiting example of the entire configuration of a development support system according to the exemplary embodiment;

FIG. 2 is a block diagram showing a non-limiting example of the hardware configuration of a development terminal 1;

FIG. 3 is a block diagram showing a non-limiting example of the hardware configuration of a game apparatus 2;

FIG. 4 illustrates a cut scene;

FIG. 5 illustrates the cut scene;

DETAILED DESCRIPTION OF NON-LIMITING EXAMPLE EMBODIMENTS

Figure 6:
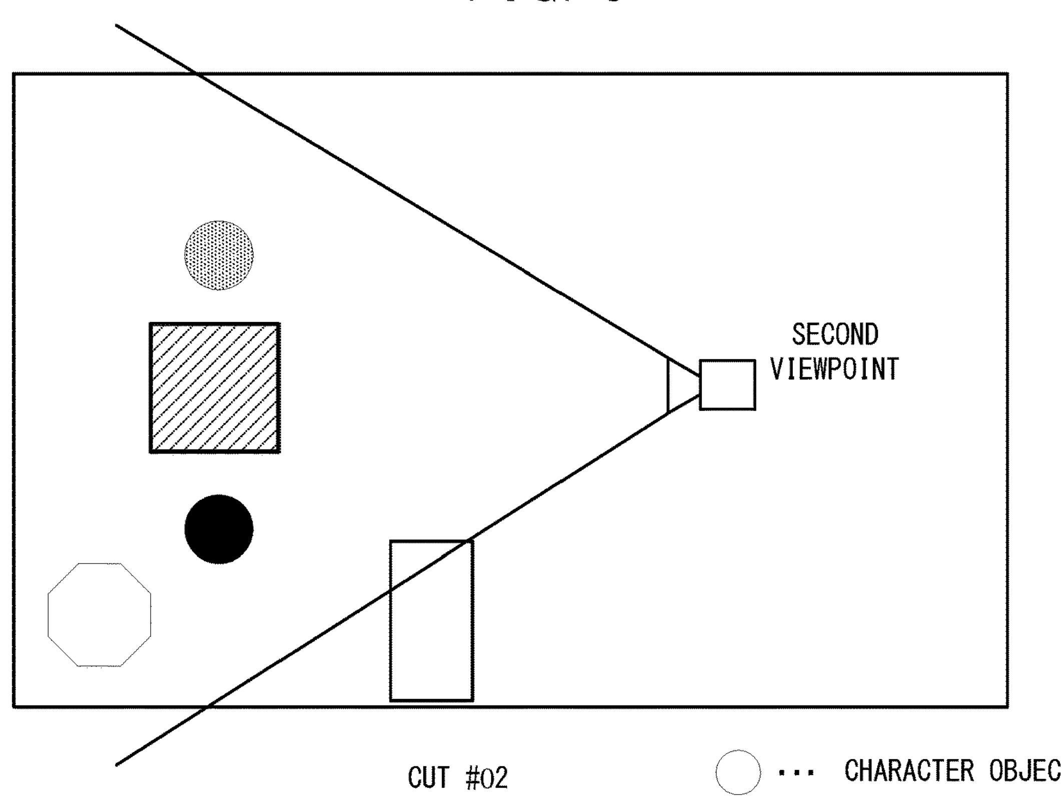
FIG. 6 illustrates the cut scene.

Hereinafter, one exemplary embodiment of the present disclosure will be described. FIG. 1 is a schematic diagram showing the entire configuration of a game development support system according to the exemplary embodiment. A game development support system 100 of the exemplary embodiment includes a development terminal 1 and a game apparatus 2. The development terminal 1 is a personal computer, for example. The development terminal 1 and the game apparatus 2 are configured to be communicable with each other via a wire. In the exemplary embodiment, predetermined instructions are transmitted from the development terminal 1 to the game apparatus 2, thereby causing the game apparatus 2 to execute various processes. In addition, the execution states, the execution results, and the like can be acquired from the game apparatus 2. That is, an environment that allows a game developer to operate a predetermined program or the like on the game apparatus 2 connected to the development terminal 1, and progress development tasks while checking the result of game processing and the like on the actual machine, is constructed.

[Hardware Configuration of Development Terminal]

Next, the hardware configuration of the development terminal 1 will be described. FIG. 2 is a block diagram showing the hardware configuration of the development terminal 1. The development terminal 1 includes a processor 11. The processor 11 is an information processing section for executing various types of information processing to be executed in the development terminal 1. The processor 11 executes information processing programs (e.g., programs for various tools for game development) stored in the memory 12 to execute the various types of information processing. The memory 12 may be, for example, an internal storage medium such as a flash memory or a dynamic random access memory (DRAM), or may be configured to use an external storage medium mounted to a slot (not shown), or the like.

The development terminal 1 further includes a communication section 13 for performing communication with the game apparatus 2. Although communication via a wired connection is used as the above communication in the exemplary embodiment, wireless communication may be used in another embodiment.

The development terminal 1 further includes an input device communication section 14 for performing wired or wireless communication with various input devices 16 such as a keyboard and a mouse. A display unit 17 (e.g., a monitor of a personal computer) is connected to the development terminal 1 via an image/sound output section 15. The processor 11 outputs an image and sound generated by, for example, executing the above information processing to the display unit 17 via the image/sound output section 15.

[Hardware Configuration of Game Apparatus 2]

FIG. 3 is a block diagram showing an example of the hardware configuration of the game apparatus 2 according to the exemplary embodiment. In FIG. 3 the game apparatus 2 includes a processor 21. The processor 21 is an information processing section for executing various types of information processing to be executed in the game apparatus 2. In the exemplary embodiment, the processor 21 is composed of a SoC (System-on-a-chip) having at least a CPU (Central Processing Unit) function and a GPU (Graphics Processing Unit) function. The CPU and the GPU may be separately configured. The present disclosure is also applicable to a configuration having no GPU, and performing graphic processing with a CPU. The processor 21 executes the various types of information processing by executing an information processing program (e.g., a game program) stored in the memory 22. The memory 22 may be, for example, an internal storage medium such as a flash memory or a dynamic random access memory (DRAM), or may be configured to use an external storage medium or the like mounted to a slot (not shown).

The game apparatus 2 further includes a communication section 23 for communicating with the development terminal 1.

The game apparatus 2 further includes a controller communication section 24 for the game apparatus 2 to perform wired or wireless communication with a game machine controller 26.

Moreover, a display unit 27 (e.g., a television or the like) is connected to the game apparatus 2 via an image/sound output section 25. The processor 21 outputs an image and sound generated by executing the above information processing, to the display unit 27 via the image/sound output section 25.

[Development Environment and Processing Assumed in Exemplary Embodiment]

Next, an outline of processing assumed in the exemplary embodiment will be described. The processing of the exemplary embodiment is assumed to be mainly used in a game development stage. Specifically, in the exemplary embodiment, processing for addressing load in a rendering process in a cut scene (also referred to as "event demoscene" or the like) that is video-represented in a predetermined event in a game will be described. In advance of describing the outline of this processing, a cut scene of the exemplary embodiment will be described. The cut scene of the exemplary embodiment is represented as a state of a virtual game space that is rendered by real-time rendering (on-the-fly rendering). The frame rate is, for example, 30 fps in the exemplary embodiment although any frame rate may be adopted. In the exemplary embodiment, during the cut scene, an operation (movement operation, attack operation, etc.) performed by a player to control the motion of a player object is not received. During the cut scene, each of objects arranged in the virtual space (rendering range) moves based on a predetermined motion pattern. That is, the cut scene of the exemplary embodiment is a scene that does not perform an interactive response to an operation performed by the player, among scenes rendered through rendering of the virtual space. Therefore, it can be said that the cut scene is a reproducible scene. However, the cut scene may be subjected to a control to an extent not affecting the load of the rendering process. For example, the cut scene may be a scene that performs an interactive response to a control that does not significantly increase/decrease the load of the rendering process, such as slight camera control, on/off of a small UI or a caption, output of sound effect, etc.

The cut scene is composed of at least one "cut". Within one cut, switching of the viewpoint (virtual camera) is not performed basically. Switching of the viewpoint is caused by instantaneous movement of the virtual camera. Continuous but not rapid movement of the virtual camera is performed even within a cut. Typically, a change of a cut corresponds to a timing of switching of a viewpoint.

Figure 7:
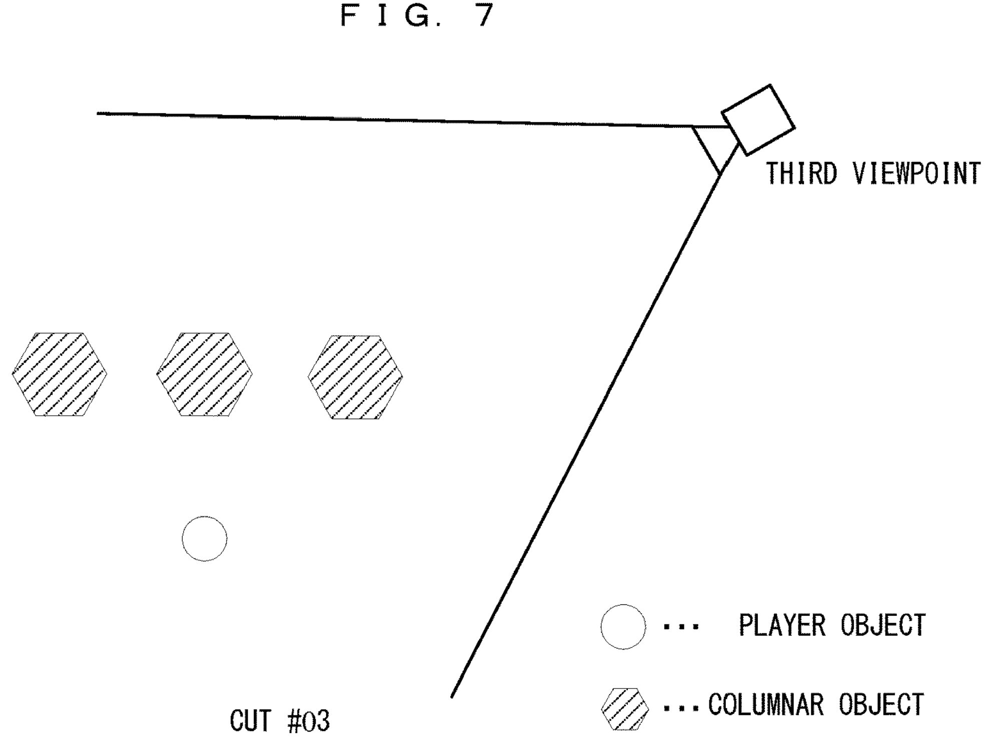
FIG. 7 illustrates the cut scene.

FIG. 4 schematically shows an example of a configuration of a certain cut scene. It is assumed that this cut scene is composed of three cuts from a cut #01 to a cut #03. As for the length of each cut, the cut #01 is 5 seconds, and each of the cuts #02 and #03 is ten seconds. FIG. 5 to FIG. 7 are schematic diagrams in which the virtual spaces in the respective cuts are viewed from above. In FIG. 5, a player object and three columnar objects are present in the virtual space being an outdoor space. The cut #01 is an example in which a first viewpoint (i.e., the position of the virtual camera) is set on the back side of the player object. Therefore, in the cut #01, the state of the virtual space viewed from the first viewpoint is rendered. In FIG. 6 showing the cut #02, a second viewpoint is set at a predetermined position in an indoor space different from the scene of the cut #01. Therefore, in the cut #02, the scene is changed from outdoors to indoors, and the state of the indoor space viewed from the second viewpoint is rendered. In FIG. 7 showing the cut #03, a third viewpoint is set at a position different from the first viewpoint in the same outdoor space as in the cut #01. Therefore, in the cut #03, the scene is changed from indoors to outdoors, and a state in which the same player object and columnar objects as in the cut #01 are viewed from the third viewpoint is rendered. Thus, the cut scene has a cut configuration as follows. That is, the state of the virtual space viewed from the first viewpoint is rendered for 5 seconds. Thereafter, the scene is changed to indoors, and the state of the indoor space viewed from the second viewpoint is rendered for 10 seconds. Thereafter, the scene is changed to outdoors again, and the state of the outdoor space viewed from the third viewpoint is rendered for 10 seconds.

Since the cut scene is real-time rendered as described above, the load on the GPU (hereinafter referred to as "GPU load") may vary depending on the states of subjects to be rendered (number of objects, number of polygons, and presence/absence of various effects). For example, it is conceivable that, under a predetermined situation such as a cut change at which the content of rendering may be significantly changed, the GPU load is sharply increased to almost the limit of the performance of the GPU. Such a sharp increase in the GPU load may result in a temporary reduction in the frame rate (occurrence of slowdown of the GPU). Moreover, for example, if the GPU load is increased up to the performance limit of the GPU in a certain frame, the state of slowdown may continue over several frames that follow.

In relation to the processing load on the GPU as described above, a technique called "dynamic resolution" has been known. Dynamic resolution is, in short, a technique of reducing rendering resolution when the processing load on the GPU has been increased to an extent that may cause slowdown, thereby reducing the GPU load. This function is also installed in the game apparatus 2. More specifically, in dynamic resolution, a process of determining whether or not to reduce the resolution is performed based on the GPU load in an immediately previous frame. For example, if the measurement result of the GPU load in the immediately previous frame in which the resolution was 720 p has exceeded a predetermined threshold value, rendering is performed in the current frame with the resolution being reduced to 540 p. In other words, since measurement of the GPU load is delayed by at least one frame, it takes time before the resolution is reduced after occurrence of the slowdown. Therefore, when the processing load on the GPU has been sharply increased to almost the limit, slowdown instantaneously occurs (because the resolution has not yet been reduced). That is, in dynamic resolution, since the resolution is changed after measurement of the GPU load has ended, occurrence of slowdown cannot be avoided in processing the frame in which the GPU load has been increased to an extent that causes slowdown (in processing several frames that follow this frame, in some cases). Meanwhile, in a case where the resolution is changed for the processing load per frame, the resolution may repeat sharp increase/decrease. In order to avoid such a phenomenon, setting is made such that the resolution is reduced after the high-load state has continued for a while, but such setting makes slowdown more conspicuous.

In view of the above, in the exemplary embodiment, the following processing is performed to deal with occurrence of slowdown as described above. Firstly, in the development stage, GPU loads in frames in a cut scene are checked in advance. Next, based on transition of the GPU loads, a frame in which the GPU load is sharply increased is analyzed. The GPU load in this frame is stored as "substitute load". In addition, a predetermined frame (described later in detail) previous to the frame in which the GPU load is sharply increased, is stored as "resolution forced setting frame". In actual game processing (product version ROM), in processing a frame number of the resolution forced setting frame, the dynamic resolution as described above is caused to function by using the information "substitute load" indicating the GPU load checked in advance. Thus, the function of dynamic resolution is caused to recognize the situation that the GPU load is increased in the stage preceding the frame in which the GPU load is actually sharply increased, and is caused to perform a process to reduce the resolution. As a result, the process in the frame in which the GPU load is sharply increased is performed with the reduced resolution, whereby slowdown (reduction in the frame rate) due to the sharp increase in the GPU load can be avoided. Moreover, the "resolution forced setting frame" and the "substitute load" described above are applicable not only to the case where the GPU load is sharply increased but also to various purposes. Hereinafter, the outline of the manner of determining the resolution forced setting frame and the substitute load will be described with reference to the drawings.

Figure 8:
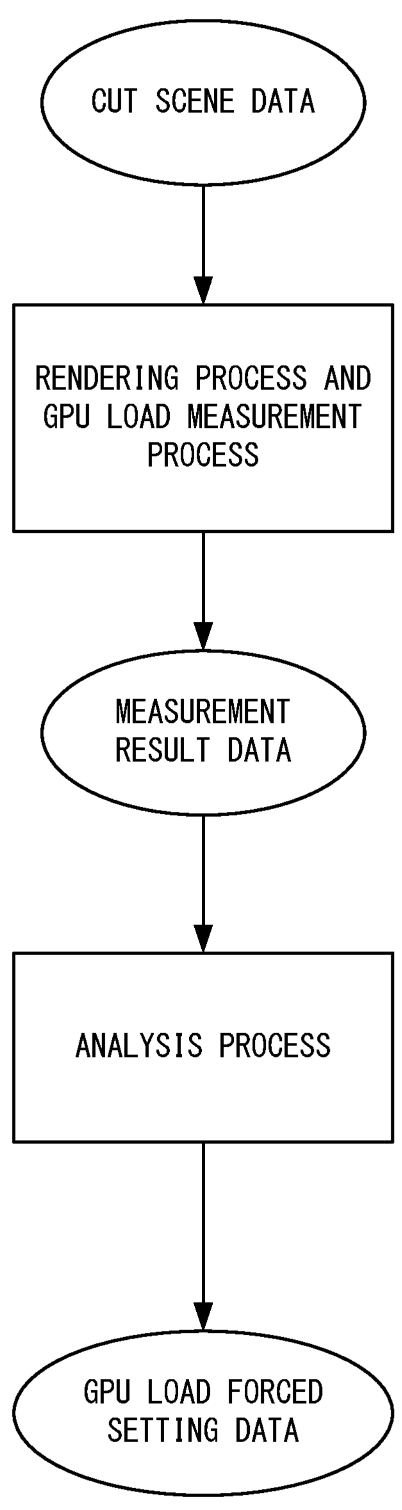
FIG. 8 illustrates an outline of processing according to the exemplary embodiment.
Figure 9:
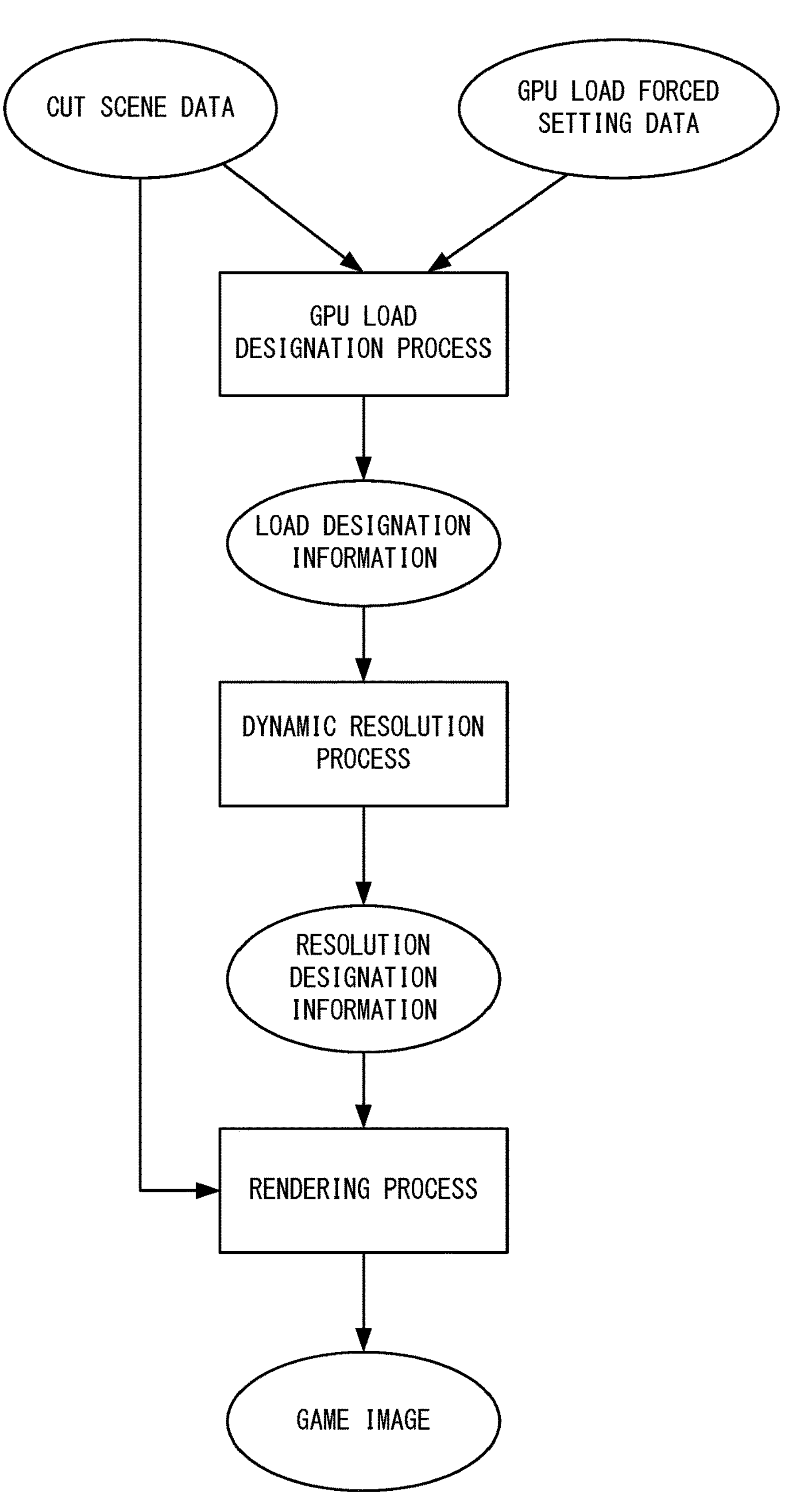
FIG. 9 illustrates an outline of processing according to the exemplary embodiment.

FIG. 8 and FIG. 9 illustrate the outline of processing according to the exemplary embodiment. In the exemplary embodiment, as shown in FIG. 8, firstly, the game apparatus 2 is caused to perform a process of rendering a cut scene and a process of measuring a GPU load in each frame, by using cut scene data based on which the cut scene is rendered. In this case, the game apparatus 2 is caused to perform the rendering process while setting the game apparatus 2 so as not to use the function of dynamic resolution. That is, the game apparatus 2 is caused to reproduce the cut scene without using the function of dynamic resolution, and the process of checking the GPU load during the reproduction is performed. More specifically, for each frame of the cut scene, the GPU load in said frame, and whether or not a cut change has occurred are determined. Then, the measurement result is outputted as measurement result data.

Next, a process of analyzing the measurement result data is executed in the development terminal 1. In the analysis process, the following analyses are performed.

(1) Analysis for Transition of GPU Load Immediately after Cut Change

It is conceivable that the GPU load tends to be significantly changed immediately after a cut change. For example, it is conceivable that, if there is a cut change from an outdoor cut to an indoor cut, the content of "picture" to be rendered significantly changes before and after the cut change. That is, it is conceivable that the processing load during the real-time rendering is significantly changed because the objects to be rendered are completely replaced, for example. In this regard, in the exemplary embodiment, firstly, a frame immediately after a cut change is picked up as the resolution forced setting frame. Furthermore, a GPU load that is maximum within a period from the 5th frame to the 20th frame after the cut change, is picked up as the substitute load.

The period from the 5th frame to the 20th frame is an example, and a period other than this period may be used. For example, a period from the 2nd frame to the 20th frame after the cut change may be used.

Moreover, in this analysis, as for the GPU load, particular determination using a threshold such as "not less than x %" is not performed, and just a "maximum" GPU load within the period is picked up. Therefore, the picked-up GPU load may not necessarily be so high as to cause slowdown.

(2) Analysis for Presence/Absence of Sharp Increase in GPU Load within the Same Cut It is also conceivable that the GPU load is sharply increased within the same cut even when it is not immediately after a cut change. Also, in this case, slowdown may occur for several frames. In this case, since the slowdown occurs within the same cut, the "picture" is not always changed significantly like in the cut change, so that even slowdown for about 1 to 2 frames may become conspicuous. Therefore, a resolution forced setting frame and a substitute load are set also in the case where the GPU load is sharply increased within the same cut. Specifically, in the exemplary embodiment, the frames in the same cut are checked according to rules, as follows.

(2A) After a cut change, a period that overlaps an analysis immediately after the cut change (up to the 20th frame, in this example) is not subjected to the analysis.

(2B) If a frame in which the GPU load is increased by 30% or more is present within a period of 40 frames from an analysis target frame, this analysis target frame is set as the resolution forced setting frame, and the GPU load in the detected frame with the increased load is picked up as the substitute load.

(2C) During a period of 10 frames from the frame previously picked up as the resolution forced setting frame, even if the GPU load is increased by 30% or more, pick-up of the resolution forced setting frame and the substitute load is not performed. The reason is because the condition of the above (2B) is satisfied for each frame if the GPU load continues increasing.

The thresholds such as "period of 40 frames" and "increase by 30% or more" are examples, and different thresholds may be used as appropriate according to the content of the cut scene and the content of the game.

Since the above analysis is analysis within the "same cut", determination across different cuts is not performed. For example, in the analysis of the above (2B), if the cut ends in a time period shorter than the period of 40 frames, a period up to a frame at which the cut ends is an analysis target for this cut.

Information about the resolution forced setting frame and the substitute load picked up as a result of the analysis process described above, is outputted as "GPU load forced setting data". Finally, this data is included in the product version ROM.

In the exemplary embodiment, the load measurement process and the analysis process as described above are periodically executed. Hereinafter, these processes are referred to as "periodic measurement process". For example, the development environment may be configured such that the periodic measurement process is automatically executed once every day (like a batch process). Even when the developer has updated the content of the cut scene or the rendering process, the periodic measurement process executed as described above allows appropriate rendering setting according to the updated content without requiring the developer to do the development tasks again. Thus, reduction of the burden of the development tasks can be expected.

Next, the outline of game processing using the GPU load forced setting data will be described with reference to FIG. 9. Firstly, it is premised that the above dynamic resolution process is used in the game processing. In the dynamic resolution process, as described above, the resolution in the current frame is determined based on the GPU load in the previous frame. Therefore, a rough flow of the process includes "acquisition of information about the GPU load in the previous frame", "determination of resolution", and "rendering process" in this order.

In the exemplary embodiment, in processing each frame, firstly, a GPU load designation process using cut scene data and the GPU load forced setting data is performed. In this process, whether or not a frame number to be currently processed is registered in the GPU load forced setting data is determined. Then, "load designation information" is outputted based on the result of the determination. As for the content of the "load designation information", if the frame number to be currently processed is not registered in the GPU load forced setting data, information of the GPU load in the previous frame is set. Meanwhile, if the frame number to be currently processed is registered in the GPU load forced setting data, the substitute load set in the GPU load forced setting data is set. That is, the GPU load measured in the development stage is set.

Next, a dynamic resolution process with the load designation information being a parameter is executed. Information indicating a resolution determined as a result of the process (hereinafter referred to as "resolution designation information") is outputted and transferred to the rendering process.

In the rendering process, various processes such as rendering are executed based on the resolution indicated by the resolution designation information. As a result, a game image having the resolution indicated by the resolution designation information is generated and outputted.

In the analysis at a cut change, a frame in which the "GPU load is maximum" is simply picked up. Therefore, for example, if the picked up load is not a GPU load that is high to an extent that causes slowdown, the resolution may not necessarily be changed.

In order to avoid chattering (frequent resolution change), the dynamic resolution also has a function of preventing a resolution change within 60 frames (2 seconds) from the last resolution change. More specifically, since it is conceivable that the resolution is further reduced if the processing load is still high even after the resolution was reduced, the resolution should not be increased within 60 frames (2 seconds) after the last resolution change. In this case, in the dynamic resolution process, the reduced resolution may be forcedly returned by (forcedly) designating the load designation information. For example, if "GPU load that is not high to an extent that causes slowdown" is transferred to the dynamic resolution process as the load designation information, before 60 frames elapse after the resolution was reduced, the resolution may be forcedly returned at the timing of this frame. Thus, if the GPU load has been reduced at a relatively early timing after the cut change, the resolution is allowed to be quickly returned.

[Details of Processing in Exemplary Embodiment]

Next, with reference to FIG. 10 to FIG. 18, processing in the exemplary embodiment will be described in more detail.

[Used Data]

Firstly, various data used in the exemplary embodiment will be described. Here, data used in the development terminal 1 will be described first, and then data used in the game apparatus 2 will be described.

[Data Stored in Development Terminal 1]

Figures 10, 11, 12:
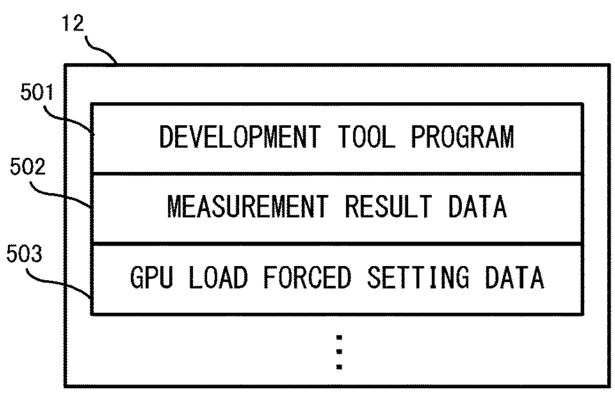
FIG. 10 is a memory map showing a non-limiting example of various data stored in a memory 12 of the development terminal 1.
FIG. 11 shows a non-limiting example of the data structure of measurement result data 502.
FIG. 12 shows a non-limiting example of the data structure of a GPU load forced setting data 503.

FIG. 10 is a memory map showing an example of various data stored in the memory 12 of the development terminal 1. The memory 12 has, stored therein, a development tool program 501, measurement result data 502, GPU load forced setting data 503, and the like.

The development tool program 501 is a program for causing the development terminal 1 to execute the processes as described above. For example, the development tool program 501 includes a program that implements a function for instructing the game apparatus 2 to execute a predetermined process such as a cut scene rendering process, and a program that implements a function for acquiring information about a GPU load or the like from the game apparatus 2.

The measurement result data 502 indicates a result of measurement of a GPU load, etc., when the game apparatus 2 is caused to render a cut scene without using the function of dynamic resolution. FIG. 11 shows an example of a data structure of the measurement result data 502. The measurement result data 502 includes items of a frame number 511, a GPU load 512, and a cut change flag 513. The frame number 511 is the number of each frame as a component of the cut scene. The GPU load 512 is information indicating a GPU load in each frame. In this example, the GPU load 512 is indicated by a value within a range from 0% to 100%. The cut change flag 513 is a flag indicating whether or not a cut change has occurred in a frame. The flag being "True" indicates that a cut change has occurred in the corresponding frame. In other words, "True" indicates that the corresponding frame is the first frame (head frame) in a cut. The flag being "False" indicates that a cut change has not occurred.

Referring back to FIG. 10, the GPU load forced setting data 503 is data outputted as a result of the analysis process as described above. FIG. 12 shows an example of a data structure of the GPU load forced setting data 503. The GPU load forced setting data 503 includes items of a forced setting frame number 514, and a substitute load value 515. The forced setting frame number 514 is a frame number picked up as a resolution forced setting frame in the analysis process as described above, and designates a frame number to which the substitute load value 515 is applied. The substitute load value 515 is a GPU load 512 picked up as a substitute load in the analysis process as described above. The GPU load forced setting data 503 is finally written as a part of game data in a product version ROM.

[Data Stored in Game Apparatus 2]

Next, data stored in the game apparatus 2 will be described. Here, data stored in the game apparatus 2 in the development stage and data stored in the memory 12 of the game apparatus 1 using a product version ROM, are separately described.

Figure 13:
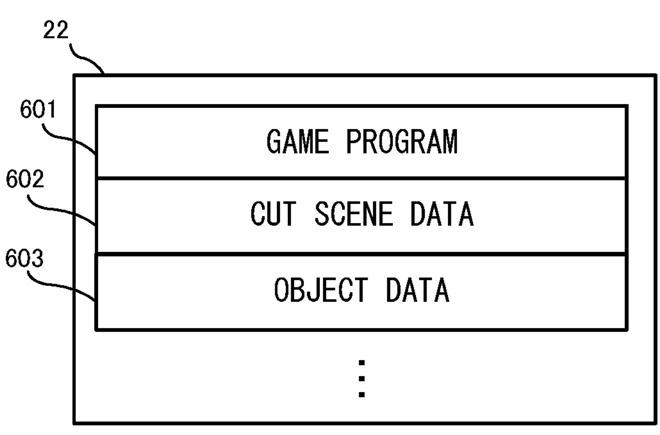
FIG. 13 is a memory map showing a non-limiting example of various data stored in a memory 22 of the game apparatus 2 (in the development stage)

FIG. 13 is a memory map showing an example of various data stored in the memory 12 of the game apparatus 1 in the development stage. The memory 12 has, stored therein, a game program 601 (in the development stage), cut scene data 602, object data 603, and the like. The game program 601 includes a program for rendering a cut scene. In addition, the game program 601 also includes a program for measuring a GPU load in each frame. The cut scene data 602 includes data for rendering the cut scene. For example, the cut scene data 602 includes: information that specifies objects (details of the virtual space) to be displayed in each cut: data that defines motion patterns of various objects; and camera parameters such as the position, angle, etc., of the virtual camera in each cut. The cut scene data 602 also includes information corresponding to the cut change flag 513. The object data 603 is data of various objects to be rendered in the cut scene. The object data 603 includes modeling data, texture data, etc., of each object.

[Data (Product Version ROM) Stored in Game Apparatus 2]

Figure 14:
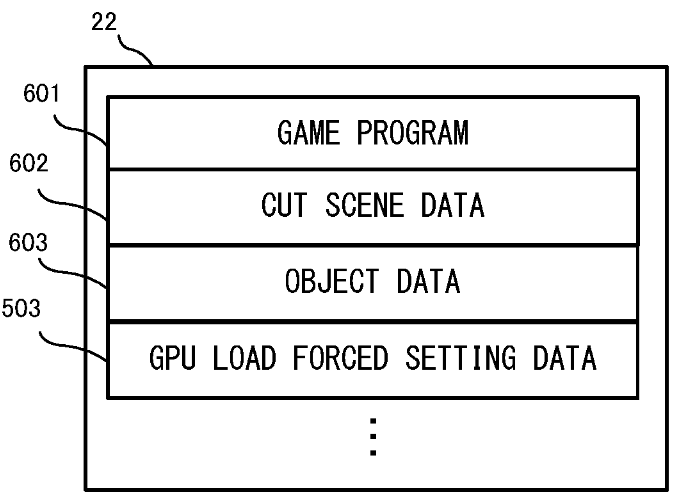
FIG. 14 is a memory map showing a non-limiting example of various data stored in the memory 22 of the game apparatus 2.

FIG. 14 is a memory map showing an example of various data stored in the memory 12 of the game apparatus 1 using a product version ROM. In other words, the various data are also data to be stored in the product version ROM. The game program 601, the cut scene data 602, the object data 603, the GPU load forced setting data 503, and the like which are read out from the product version ROM are stored in the memory 12. The game program 601, the cut scene data 602, and the object data 603 are data similar to the data shown in FIG. 15 except that these data are confirmed as product version data. The GPU load forced setting data 503 is data outputted as a result of the analysis process. Although the GPU load forced setting data 503 may be outputted a plurality of times in the development stage, data finally confirmed to be included in the product version ROM is stored in the product version ROM. As for the data in the development stage, the GPU load forced setting data 503 which is latest at that time may be stored for the purpose of checking the cut scene during the normal operation other than a periodic measurement process described later, but the description thereof is omitted.

Next, the processing in the exemplary embodiment will be described in detail. In the exemplary embodiment, one or more processors read and execute the above programs stored in one or more memories, thereby implementing flowcharts shown below. The flowcharts are merely examples of processing procedures. Therefore, as long as the same result can be obtained, the processing order of steps may be changed. In addition, the values of variables, and thresholds used in determination steps, are also merely examples, and other values may be employed as necessary.

[Periodic Measurement Process]

Figure 15:
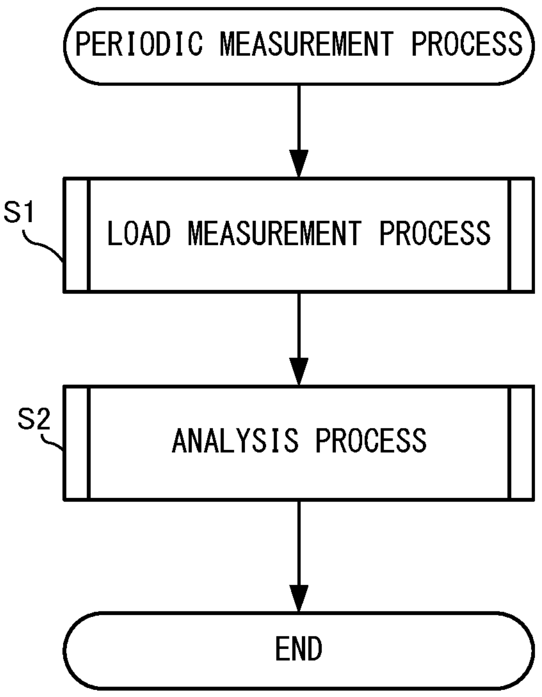
FIG. 15 is a non-limiting example of a flowchart showing the details of a periodic measurement process.

FIG. 15 is a flowchart showing in detail the periodic measurement process that is periodically executed in the development stage. In FIG. 15, firstly, in step S1, the processor 11 of the development terminal 1 executes a load measurement process. Thereafter, in step S2, the processor 11 executes an analysis process. In the exemplary embodiment, these two processes are periodically and automatically executed. Hereinafter, these processes will be described.

Figure 16:
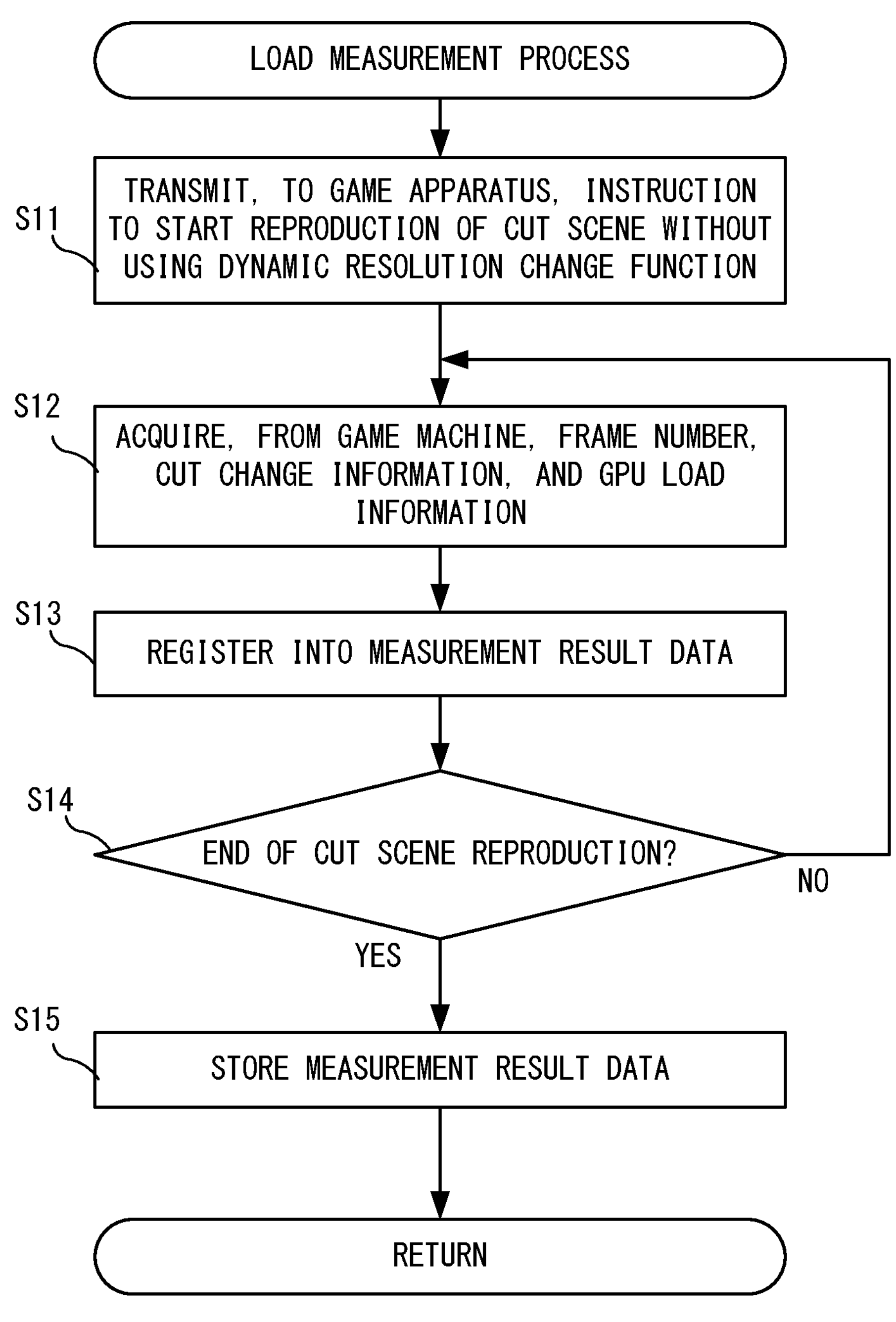
FIG. 16 is a non-limiting example of a flowchart showing the details of a load measurement process.

FIG. 16 is a flowchart showing the load measurement process in detail. In FIG. 16, firstly, in step S11, the processor 11 transmits, to the processor 21 of the game apparatus 2, an instruction to start a process (rendering process) of reproducing a cut scene (if there are a plurality of cut scenes, all of them) without using the function of dynamic resolution. In response to this instruction, the game apparatus 2 starts reproduction of the cut scene without using the function of dynamic resolution. Furthermore, although not shown in the figure, the game apparatus 2 also performs, as for the cut scene being currently reproduced, a process of transmitting, to the development terminal 1, the current frame number, information about a GPU load, and information about whether or not the current frame corresponds to a cut change.

Next, in step S12, the processor 11 acquires, from the game apparatus 2, the frame number, the information about the GPU load, and the information regarding a cut change. The processor 11 may acquire these pieces of information for each frame, or may collectively acquire these pieces of information corresponding to a plurality of frames that have been stored in the game apparatus 2. In the following step S13, the processor 11 registers the acquired information in the measurement result data 502.

Next, in step S14, the processor 11 determines whether or not the cut scene reproduction process in the game apparatus 2 has ended. If the reproduction process has not yet ended (NO in step S14), the process returns to step S12 described above, and is continued. Meanwhile, if the reproduction process has ended (YES in step S14), the processor 11 confirms and stores the content of the measurement result data 502 in step S15. This is the end of the load measurement process.

Figure 17:
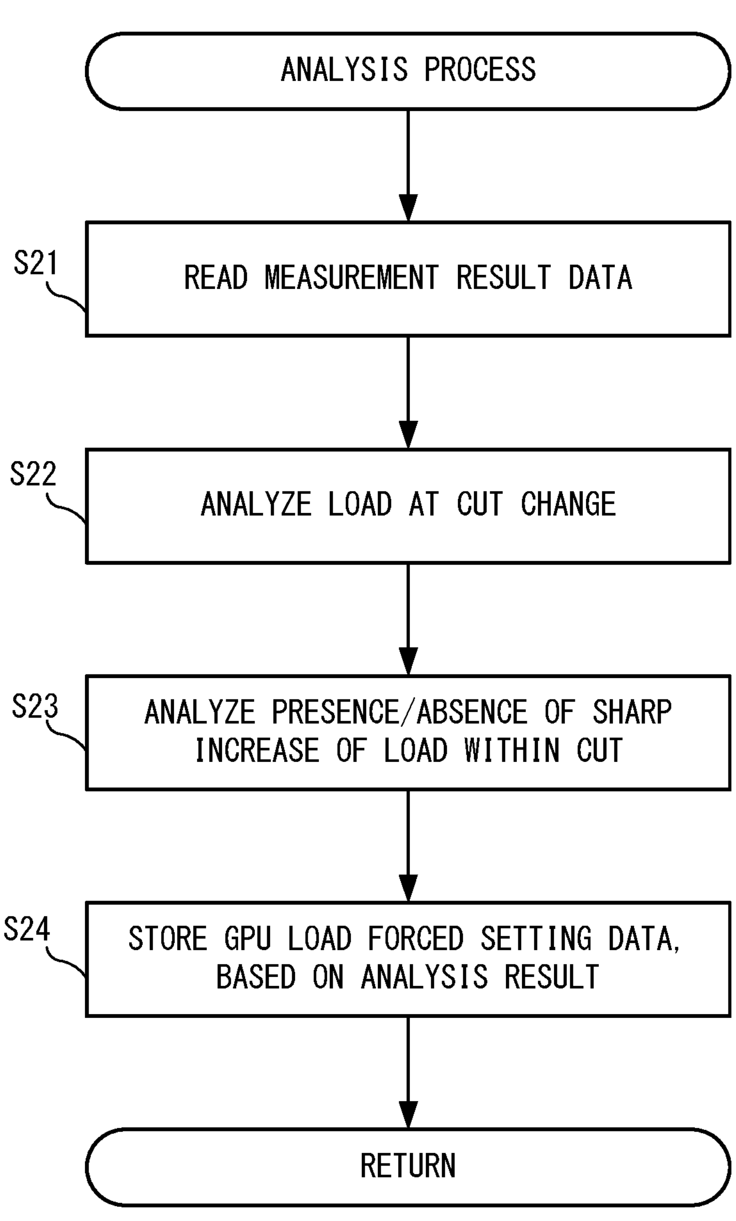
FIG. 17 is a non-limiting example of a flowchart showing the details of an analysis process.

Next, the analysis process in step S2 will be described in detail. FIG. 17 is a flowchart showing the analysis process. In FIG. 17, firstly, in step S21, the processor 11 reads the measurement result data 502.

Next, in step S22, the processor 11 analyzes the GPU load immediately after a cut change. Specifically, based on the cut change flag 513, the processor 11 specifies a period of each cut. Then, the processor 11 picks up a frame immediately after a cut change, as the resolution forced setting frame. Furthermore, the processor 11 picks up, as the substitute load corresponding to the picked up resolution forced setting frame, a frame in which the GPU load is maximum within a period from the 5th frame to the 20th frame after the cut change.

Next, in step S23, the processor 11 analyzes whether or not there is a sharp increase in the GPU load within the same cut. That is, as for the frames in the same cut, each frame is checked according to the rule as described above. Specifically, the processor 11 determines, in the order of frame numbers, whether or not there is a frame in which the GPU load is increased by 30% or more within a period of 40 frames from each frame (analysis target frame being a comparison reference) except for a period overlapping the analysis in step S22. If there is a frame in which the GPU load is increased by 30% or more, the processor 11 also determines whether or not this frame is a frame within 10 frames from the frame that was previously picked up as the resolution forced setting frame. If the frame is not a frame within 10 frames, the processor 11 picks up the analysis target frame being the comparison reference, as the resolution forced setting frame. Furthermore, the processor 11 picks up the GPU load in the frame in which the GPU load is increased by 30% or more, as the substitute load. For example, if the GPU load in the 230th frame has been increased by 30% or more with respect to the GPU load in the 200th frame, the processor 11 picks up the 200th frame as the resolution forced setting frame. In addition, the processor 11 picks up the GPU load in the 230th frame, as the substitute load. Since the above analysis is performed in cut units, determination across different cuts is not performed.

Next, in step S24, the processor 11 generates and stores the GPU load forced setting data 503, based on the analysis results in steps S22 and S23. This is the end of the analysis process.

This is the end of the description of the processing executed in the development terminal 1.

[Cut Scene Rendering Process Executed in Game Apparatus 2]

Figure 18:
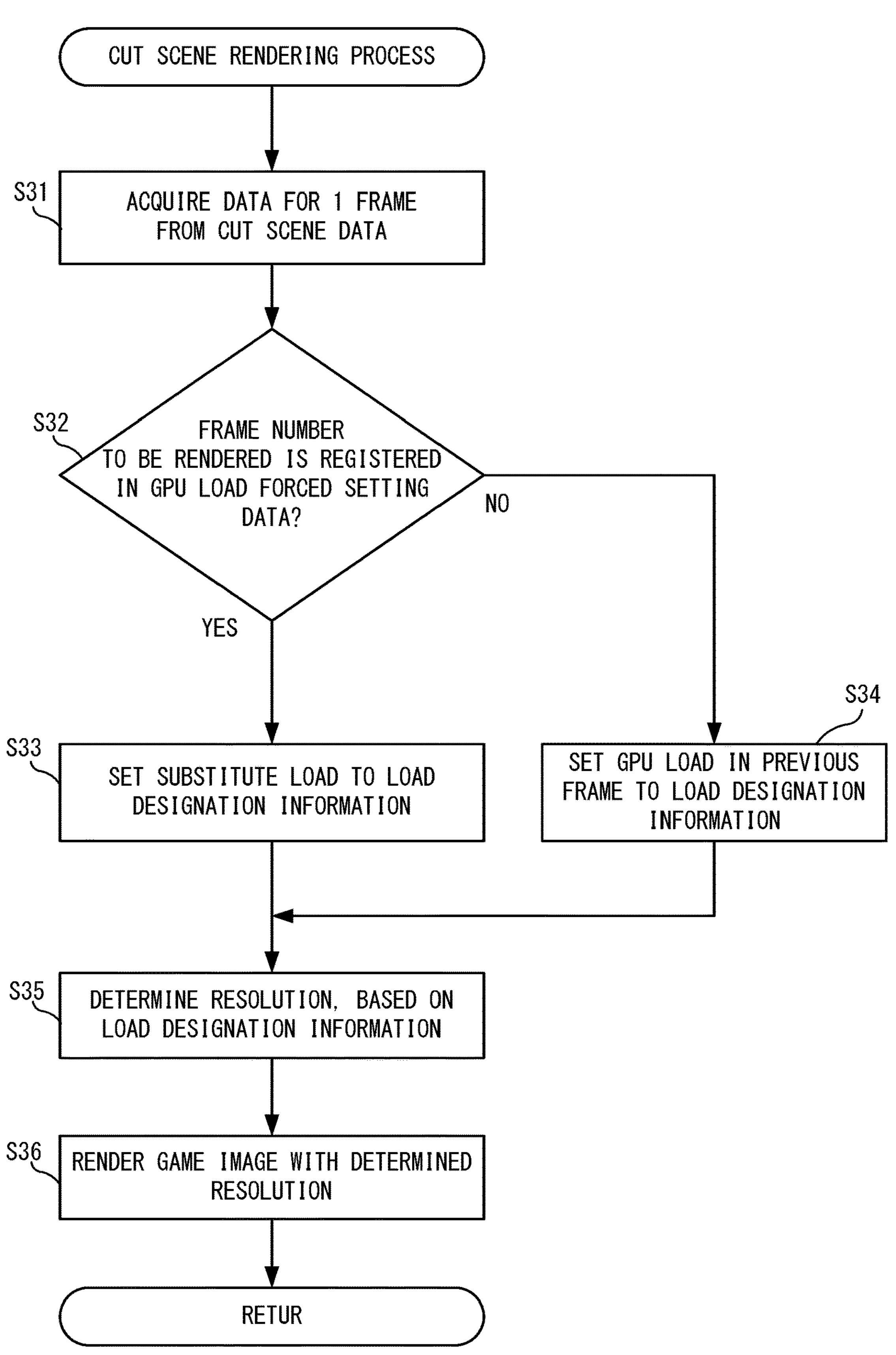
FIG. 18 is a non-limiting example of a flowchart showing the details of a cut scene rendering process.

Next, processing executed in the game apparatus 2 using the GPU load forced setting data 503 will be described. That is, game processing using a game ROM in which the finally confirmed GPU load forced setting data 503 is included as product version game data, will be described. Here, description of game processing in scenes other than cut scenes will be omitted. FIG. 18 is a flowchart showing an example of a cut scene rendering process based on a program and game data read out from the product version game ROM. The flowchart of FIG. 18 shows the rendering process for one frame. Therefore, when assuming 30 fps, for example, the process is repeated 30 times per second.

In FIG. 18, firstly, in step S31, the processor 21 acquires, from the cut scene data 602, data for one frame to be subjected to the current rendering process.

Next, in step S32, the processor 21 determines whether or not the frame number to be subjected to the current rendering process is registered in the GPU load forced setting data 503. When the result of the determination is that the frame number is registered (YES in step S32), the processor 21, in step S33, sets the substitute load value 515 to a parameter "load designation information". When the frame number is not registered (NO in step S32), the processor 21, in step S34, sets the GPU load in the previous frame as "load designation information".

Next, in step S35, the processor 21 uses the function of dynamic resolution with the "load designation information" being a parameter. As a result, a rendering resolution of the current frame is determined based on the "load designation information".

Next, in step S36, the processor 21 renders a game image with the determined resolution, and thereafter outputs the game image. This is the end of the game image rendering process for one frame.

This is the end of the detailed description of the cut scene rendering process in the game apparatus 2.

As described above, in the exemplary embodiment, the GPU load in the cut scene has been measured in advance, and the resolution forced setting frame and the substitute load are determined based on the measurement result. In the actual product, the substitute load is transferred to the function of dynamic resolution, when processing the frame designated as the resolution forced setting frame. Thus, the dynamic resolution is allowed to function based on the substitute load. Therefore, for example, the rendering process regarding a frame in which the GPU load will become 100% unless the resolution is changed, can be performed with the resolution being reduced. As a result, it is possible to reduce the processing load on the GPU, and consequently inhibit temporary reduction in the frame rate.

[Modifications]

In the above embodiment, reduction in the resolution is adopted as an example of a countermeasure against reduction in the frame rate due to increase in the GPU processing load. Alternatively, the GPU processing load may be reduced by changing the rendering setting other than the resolution. That is, the rendering setting may be temporarily changed so as to turn off a process of "heavy" effects such as anti-aliasing, instead of using the function of dynamic resolution based on the substitute load.

As for the value used as the "substitute load", in the above exemplary embodiment, the value measured in the load measurement process is used as it is. However, in another embodiment, the value to be used as the substitute load may not necessarily be an actually measured value. For example, regardless of the actually measured value, "100%" may always be used as the value of the substitute load.

While the present disclosure has been described herein, it is to be understood that the above description is, in all aspects, merely an illustrative example, and is not intended to limit the scope thereof. It is to be understood that various modifications and variations can be made without deviating from the scope of the present disclosure.

What is claimed is:

1. A game development support system, comprising:
- at least one processor, and
- a memory storing instructions executable by the at least one processor to:
- execute a game program that includes a program of dynamic rendering setting for changing a rendering setting in accordance with a load of a rendering process during a game;
- reproduce a predetermined cut scene during the game with the dynamic rendering setting being invalidated;
- measure the load of the rendering process during reproduction of the cut scene; and
- when the cut scene is reproduced with the dynamic rendering setting being valid at a timing in the cut scene satisfying a predetermined condition, based on transition of the measured load,
- set a substitute load to be used for the dynamic rendering setting instead of the load of the rendering process being executed at the timing, and store data of the substitute load for future reproductions of the predetermined cut scene during the game.

2. The game development support system according to claim 1, wherein in a first case in which, at a predetermined timing in the cut scene, a degree of increase of the load in a first period on and after the predetermined timing exceeds a predetermined criterion, the at least one processor is configured to set the substitute load for a first timing, in the cut scene, indicating the predetermined timing.

3. The game development support system according to claim 2, wherein
- the cut scene is composed of at least one cut, and
- the first period is a period on and after the first timing and having a predetermined length within a range of the cut.

4. The game development support system according to claim 3, wherein
- in a second case in which a cut change has occurred, the at least one processor is configured to store a maximum load within a second period that starts when a predetermined period has elapsed after the cut change, as the substitute load at a second timing at the cut change, and
- the substitute load based on the first case is not stored, during a third period from the second timing.

5. The game development support system according to claim 4, wherein the dynamic rendering setting includes at least dynamic resolution setting for reducing rendering resolution when the load of the rendering process during the game is high, and increasing the rendering resolution when the substitute load is low or when the load of the rendering process is low when a predetermined period has elapsed after the rendering resolution was reduced.

6. The game development support system according to claim 2, wherein in the first case, the at least one processor is configured to set a load, within the first period, which has increased and exceeded the predetermined criterion, as the substitute load at the first timing.

7. The game development support system according to claim 1, wherein the cut scene is composed of at least one cut, and in a second case in which a cut change has occurred, the at least one processor is configured to store a maximum load within a second period that starts when a predetermined period has elapsed after the cut change, as the substitute load at a second timing at the cut change.

8. The game development support system according to claim 1, wherein the dynamic rendering setting includes at least dynamic resolution setting for reducing rendering resolution when the load of the rendering process during the game is high.

9. The game development support system according to claim 1, wherein the at least one processor is configured to automatically and periodically execute the game program at a prescribed timing, perform cut scene reproduction and load measurement for each cut scene included in the game, and update and store the data of the substitute load.

10. A game development support method for a processor of a game development support system, the method comprising:

executing a game program that includes a program of dynamic rendering setting for changing a rendering setting in accordance with a load of a rendering process during a game;

reproducing a predetermined cut scene during the game with the dynamic rendering setting being invalidated;

measuring the load of the rendering process during reproduction of the cut scene; and when the cut scene is reproduced with the dynamic rendering setting being valid at a timing in the cut scene satisfying a predetermined condition, based on transition of the measured load, setting a substitute load to be used for the dynamic rendering setting instead of the load of the rendering process being executed at the timing, and storing data of the substitute load for future reproductions of the predetermined cut scene during the game.

11. The game development support method according to claim 10, further comprising in a first case in which, at a predetermined timing in the cut scene, a degree of increase of the load in a first period on and after the predetermined timing exceeds a predetermined criterion, setting the substitute load for a first timing, in the cut scene, indicating the predetermined timing.

12. The game development support method according to claim 11, wherein the cut scene is composed of at least one cut, and the first period is a period on and after the first timing and having a predetermined length within a range of the cut.

13. The game development support method according to claim 12, further comprising:

in a second case in which a cut change has occurred, storing a maximum load within a second period that starts when a predetermined period has elapsed after the cut change, as the substitute load at a second timing at the cut change, wherein the substitute load based on the first case is not stored during a third period from the second timing.

14. The game development support method according to claim 13, wherein the dynamic rendering setting includes at least dynamic resolution setting for reducing rendering resolution when the load of the rendering process during the game is high, and increasing the rendering resolution when the substitute load is low or when the load of the rendering process is low when a predetermined period has elapsed after the rendering resolution was reduced.

15. The game development support method according to claim 11, further comprising in the first case, setting a load, within the first period, which has increased and exceeded the predetermined criterion, as the substitute load at the first timing.

16. The game development support method according to claim 10, wherein the cut scene is composed of at least one cut, and in a second case in which a cut change has occurred, the method further comprises storing a maximum load within a second period that starts when a predetermined period has elapsed after the cut change, as the substitute load at a second timing at the cut change.

17. The game development support method according to claim 10, wherein the dynamic rendering setting includes at least dynamic resolution setting for reducing rendering resolution when the load of the rendering process during the game is high.

18. The game development support method according to claim 10, further comprising automatically and periodically executing the game program at a prescribed timing, performing cut scene reproduction and load measurement for each cut scene included in the game, and updating and storing the data of the substitute load.

19. A computer-readable non-transitory storage medium having stored therein a game development support program, the program when executed being configured to cause a processor of a game development terminal connected to a game apparatus to perform operations comprising:

when, in the game apparatus, dynamic rendering setting for changing a rendering setting in accordance with a load of a rendering process during a game is invalidated, and a predetermined cut scene during the game is reproduced through execution of a game program including the dynamic rendering setting, acquiring a measurement result of the load of the rendering process in the game apparatus during reproduction of the cut scene; and when the cut scene is reproduced in the game apparatus with the dynamic rendering setting being valid at a timing in the cut scene satisfying a predetermined condition, based on transition of the measured load, setting a substitute load to be used for the dynamic rendering setting instead of the load of the rendering process being executed at the timing, and storing data of the substitute load for future reproductions of the predetermined cut scene during the game.

20. The computer-readable non-transitory storage medium according to claim 19, wherein the operations further comprise, in a first case in which, at a predetermined timing in the cut scene, a degree of increase of the load in a first period on and after the predetermined timing exceeds a predetermined criterion, setting the substitute load for a first timing, in the cut scene, indicating the predetermined timing.

21. The computer-readable non-transitory storage medium according to claim 20, wherein the cut scene is composed of at least one cut, and the first period is a period on and after the first timing and having a predetermined length within a range of the cut.

22. The computer-readable non-transitory storage medium according to claim 21, wherein the operations further comprise:

in a second case in which a cut change has occurred, storing a maximum load within a second period that starts when a predetermined period has elapsed after the cut change, as the substitute load at a second timing at the cut change, and the substitute load is not stored based on the first case during a third period from the second timing.

23. The computer-readable non-transitory storage medium according to claim 22, wherein the dynamic rendering setting includes at least dynamic resolution setting for reducing rendering resolution when the load of the rendering process during the game is high, and increasing the rendering resolution when the substitute load is low or when the load of the rendering process is low when a predetermined period has elapsed after the rendering resolution was reduced.

24. The computer-readable non-transitory storage medium according to claim 20, wherein the operations further comprise, in the first case, setting a load, within the first period, which has increased and exceeded the predetermined criterion, as the substitute load at the first timing.

25. The computer-readable non-transitory storage medium according to claim 19, wherein the cut scene is composed of at least one cut, and the operations further comprise, in a second case in which a cut change has occurred, storing a maximum load within a second period that starts when a predetermined period has elapsed after the cut change, as the substitute load at a second timing at the cut change.

26. The computer-readable non-transitory storage medium according to claim 19, wherein the dynamic rendering setting includes at least dynamic resolution setting for reducing rendering resolution when the load of the rendering process during the game is high.

27. The computer-readable non-transitory storage medium according to claim 19, wherein the game apparatus is configured to automatically and periodically execute the game program at a prescribed timing, and perform cut scene reproduction and load measurement for each cut scene included in the game, and the operations further comprise acquiring a result of the measurement from the game apparatus, and updating and storing the data of the substitute load.

* * * * *